(12) United States Patent
Ho

(10) Patent No.: US 6,227,395 B1
(45) Date of Patent: May 8, 2001

(54) ELECTRICAL RECEPTACLE WITH A STAKE ASSEMBLY

(75) Inventor: Hsien-Wen Ho, Tainan (TW)

(73) Assignee: Chi-Wen Chen, Taipei (TW)

( * ) Notice: Subject to any disclaimer, the term of this patent is extended or adjusted under 35 U.S.C. 154(b) by 0 days.

(21) Appl. No.: 09/635,110

(22) Filed: Aug. 9, 2000

(51) Int. Cl.$^7$ ............... G12B 9/00; H02G 3/08
(52) U.S. Cl. ............ 220/3.9; 220/326; 220/3.3; 248/156; 248/906; 174/48
(58) Field of Search ............ 220/3.9, 3.3, 23.4, 220/326; 174/49, 48; 248/156, 906

(56) References Cited

U.S. PATENT DOCUMENTS

| | | | | |
|---|---|---|---|---|
| 3,952,908 | * | 4/1976 | Carson | 220/484 |
| 4,874,105 | * | 10/1989 | Tetreault | 220/484 |
| 5,423,499 | * | 6/1995 | Webb | 220/3.9 |
| 5,567,913 | * | 10/1996 | Lin | 220/3.9 |
| 6,008,452 | * | 12/1999 | Lux, Jr. | 220/3.3 |
| 6,114,623 | * | 5/2000 | Bonilla et al. | 220/3.3 |

* cited by examiner

*Primary Examiner*—Joseph M. Moy
(74) *Attorney, Agent, or Firm*—Ladas & Parry

(57) ABSTRACT

A stake assembly for an electrical receptacle includes a stake formed with a slot, and a coupling device mounted movably on the stake for sliding along the slot. The coupling device includes a pair of opposite engaging members respectively having first protrusions, each of which has a hooking end adapted to hook releasably with the receptacle. The engaging members are slidable along the slot between a first position, in which the hooking ends of the first protrusions engage the receptacle, and a second position, in which the first protrusions move toward each other from the first position and the hooking ends disengage from the receptacle. The coupling device further includes an urging member that urges the engaging members to move from the second position to the first position.

15 Claims, 5 Drawing Sheets

ELECTRICAL RECEPTACLE WITH A STAKE ASSEMBLY

BACKGROUND OF THE INVENTION

1. Field of the Invention

This invention relates to an electrical receptacle, more particularly to a stake assembly for an electrical receptacle.

2. Description of the Related Art

FIG. 1 illustrates a conventional stake 1 for an electrical receptacle 2. The electrical receptacle 2 includes a pair of housing halves 23 which form an end wall 21 and a central opening 22 in the end wall 21 when coupled together. The stake 1 includes a cone-shaped body 11 formed with a top plate 12 and an engaging post 13 which projects from the top plate 12, and which has a diameter greater than that of the central opening 22. An annular groove 15 is formed in the engaging post 13 for engaging the end wall 21 at a periphery of the central opening 22 when the engaging post 13 projects through the central opening 22 and into the electrical receptacle 2.

Since the coupled housing halves 23 of the electrical receptacle 2 are required to be separated from each other so as to permit the engaging post 13 to be received in or to be taken out from the electrical receptacle 2, it is inconvenient for the user to mount or dismount the electrical receptacle 2 on or from the stake 1.

SUMMARY OF THE INVENTION

Therefore, the object of the present invention is to provide a stake assembly that can be engaged or disengaged from an electrical receptacle without dismantling the housing of the latter.

According to the present invention, a stake assembly for an electrical receptacle comprises: a stake having a top end formed with a slot; and a coupling device mounted movably on the top end of the stake for sliding along the slot, the coupling device including a pair of opposite engaging members adapted to interconnect the stake and the receptacle, the engaging members respectively having first protrusions, each of which has a stem portion projecting from the slot toward the receptacle, and a hooking end extending laterally from the stem portion and adapted to hook releasably with the receptacle, the engaging members being slidable along the slot between a first position, in which the hooking ends of the first protrusions engage the receptacle, and a second position, in which the first protrusions move toward each other from the first position and the hooking ends disengage from the receptacle, the coupling device further including an urging member that urges the engaging members to move from the second position to the first position.

BRIEF DESCRIPTION OF THE DRAWINGS

In drawings which illustrate an embodiment of the invention.

DETAILED DESCRIPTION OF THE PREFERRED EMBODIMENT

Figure 1:
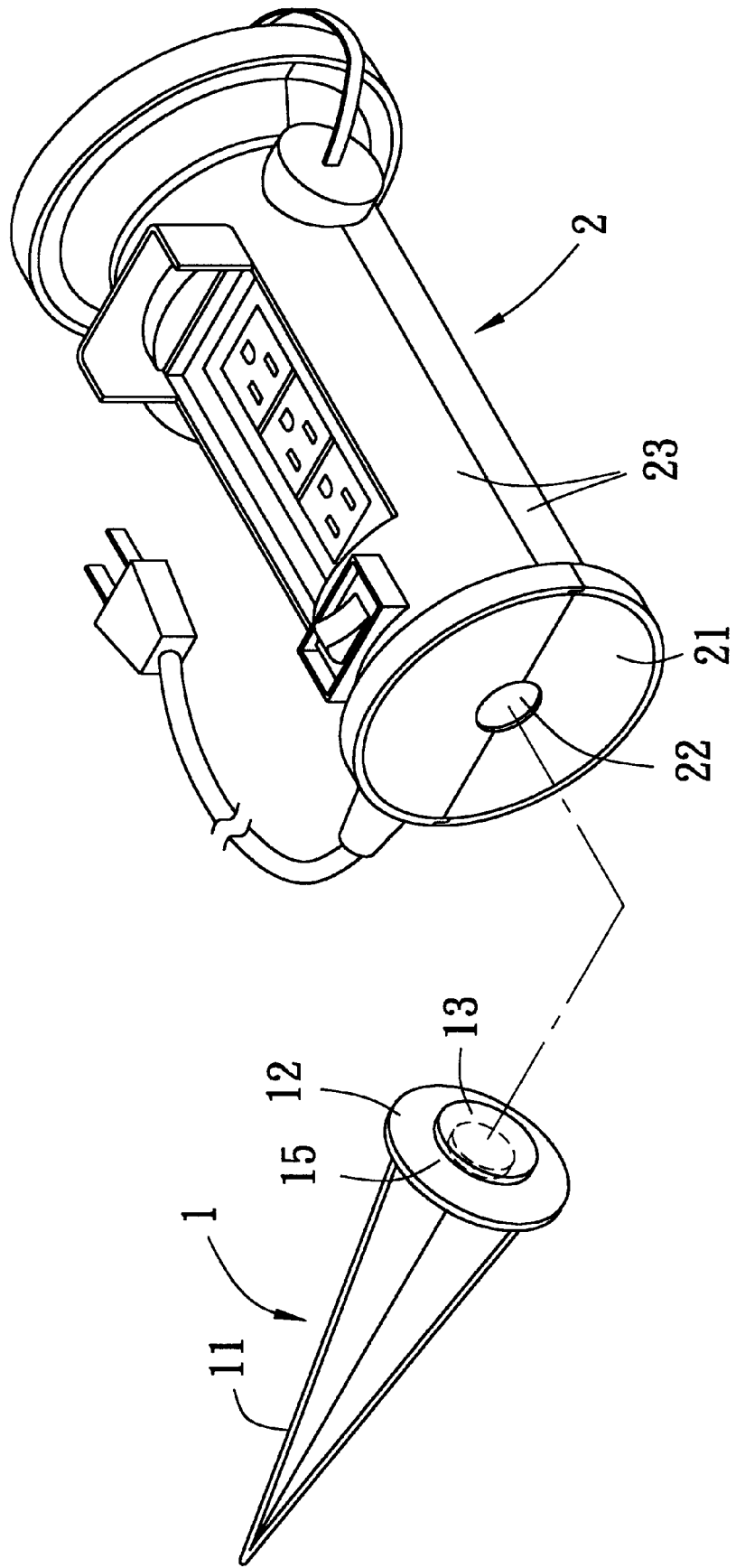
FIG. 1 is a perspective view of a conventional electrical receptacle with a stake.
Figure 2:
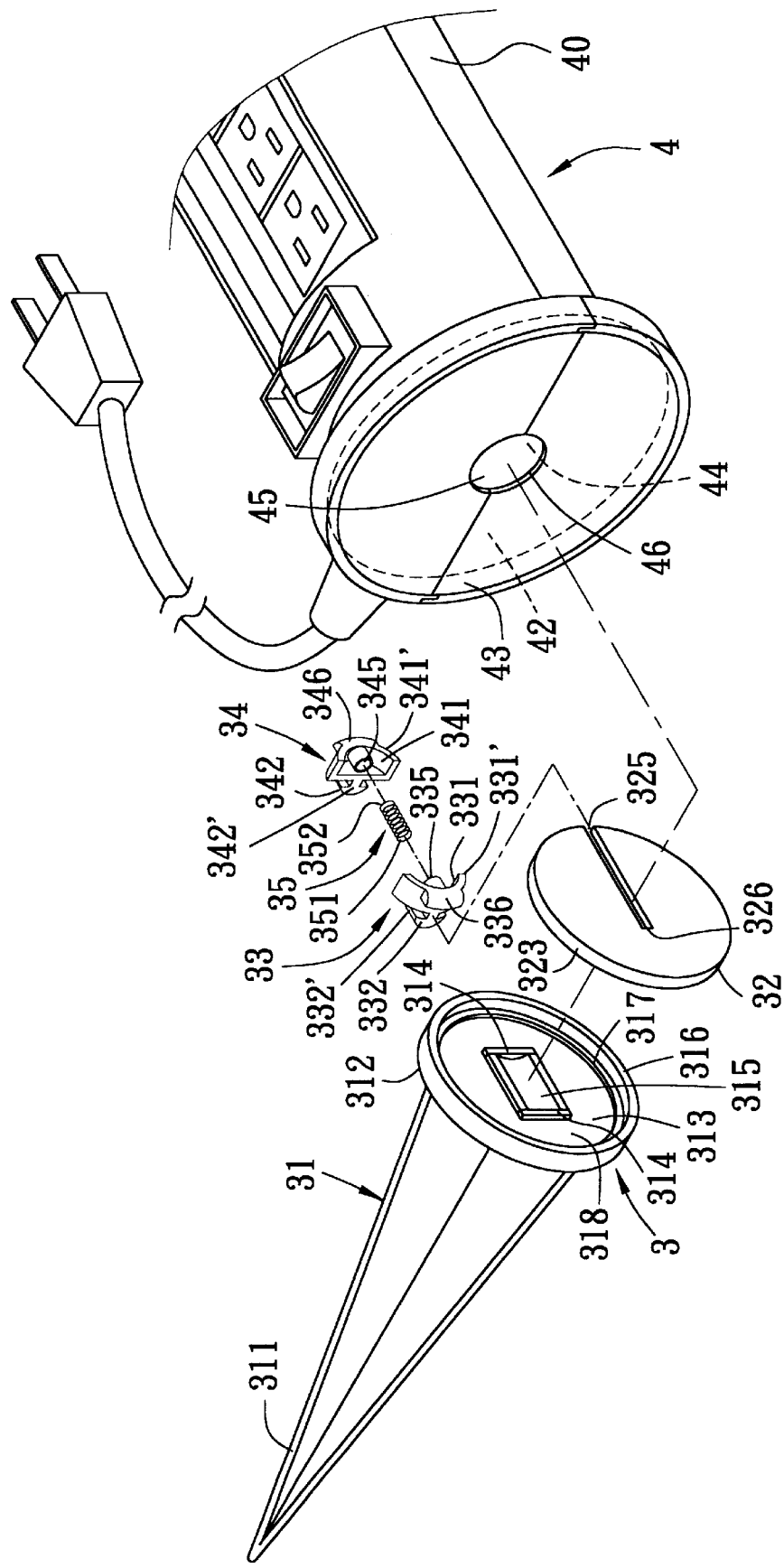
FIG. 2 is a fragmentary exploded perspective view of an electrical receptacle with a stake assembly embodying this invention.
Figure 3:
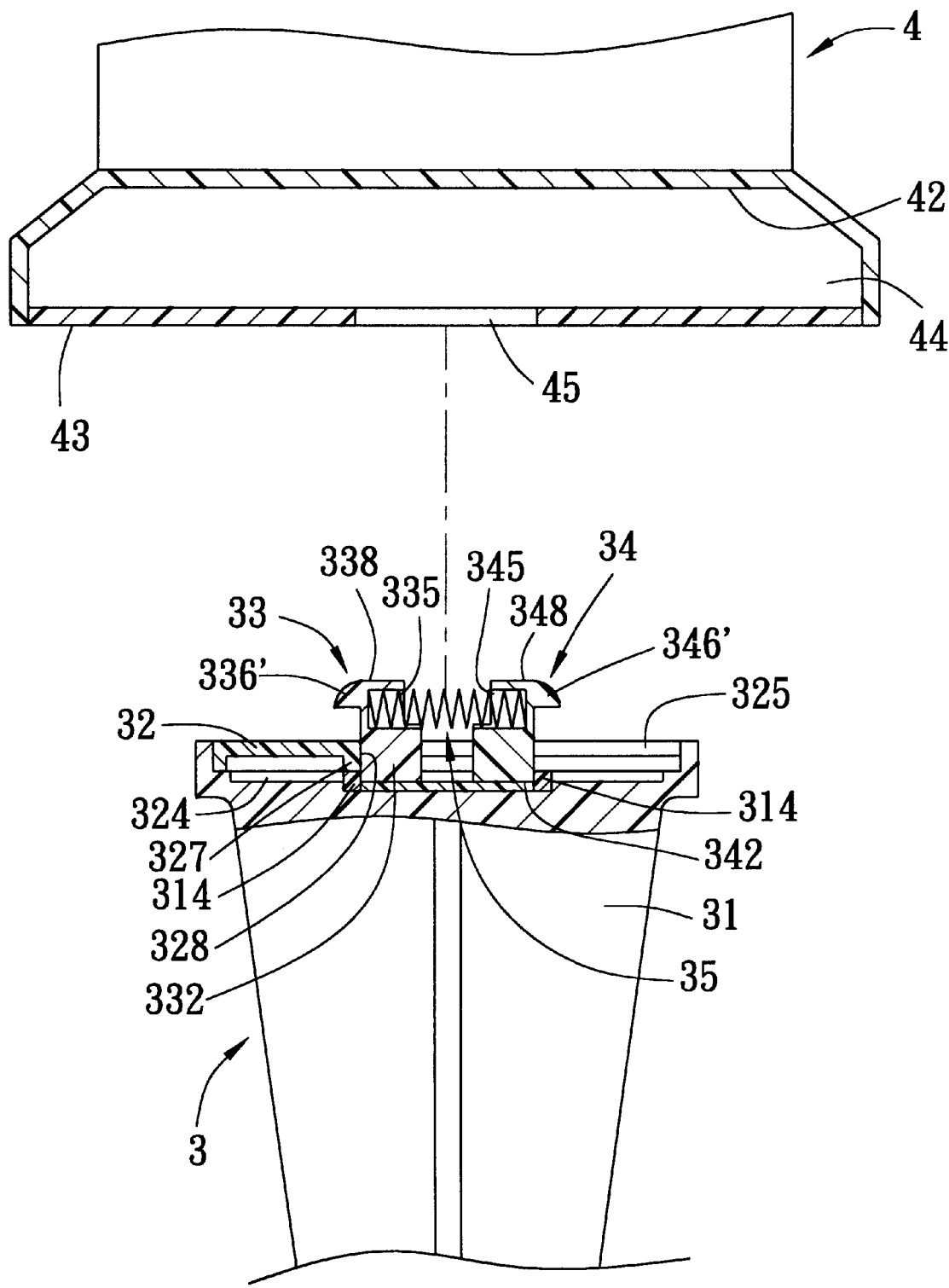
FIG. 3 is a fragmentary cross-sectional side view of the stake assembly of FIG. 2.
Figure 4:
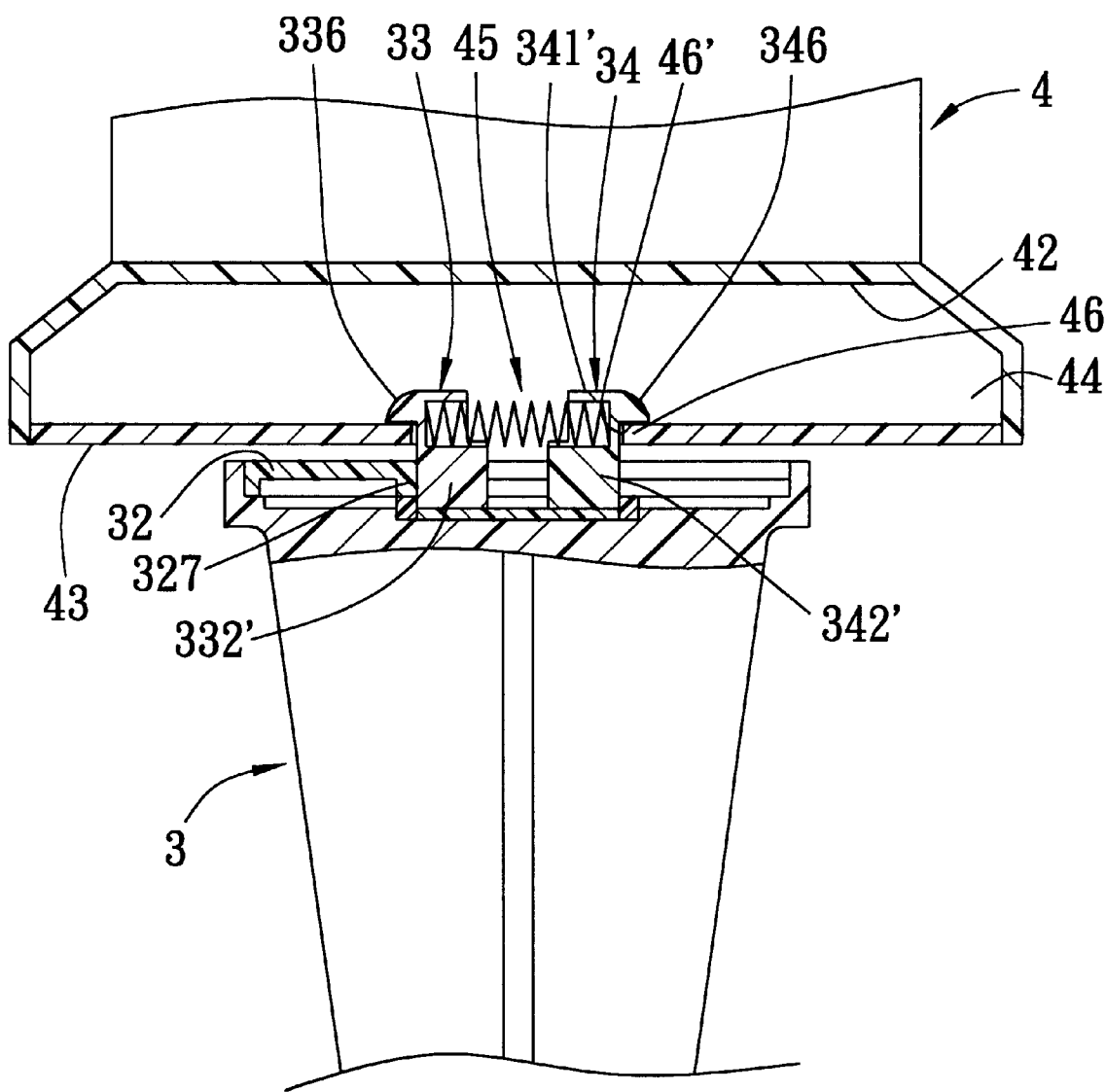
FIG. 4 is a fragmentary cross-sectional side view of the stake assembly of FIG. 2 with the electrical receptacle connected thereto.

FIGS. 2 to 4 illustrate a stake assembly 3 embodying this invention for an electrical receptacle 4. The electrical receptacle 4 includes a housing 40 with an end wall 43 that is formed with a central opening 45. An inner plate 42 is disposed in and is connected to the housing 40 to cooperate with the end wall 43 to confine an inner space 44 therebetween.

The stake assembly 3 includes a stake 31, a cover plate 32, and a coupling device. The stake 31 is cone-shaped, and has a tip end 311 adapted to be driven into the ground, and a top end 312 formed with a frame. The frame includes a top face 313 facing the end wall 43 of the housing 40, and an annular flange 316 projecting from a periphery of the top face 313 to confine a recess 318. A pair of spaced apart stoppers 314 project from the top face 313 toward the end wall 43 of the housing 40, and confine a gap 315 therebetween. A lip 317 projects radially and inwardly from the annular flange 316.

The cover plate 32 is disposed between the top face 313 of the frame and the end wall 43 of the housing 40, and has a rim 323 secured to the annular flange 316 and the lip 317 for covering the recess 318. A slot 325 is formed in the cover plate 32, and has a closed end 326 that is aligned with one of the stoppers 314, and an open end that opens at the rim 323. A pushing arm 327 projects from one side of the cover plate 32 at the closed end 326 of the slot 325 toward said one of the stoppers 314, and has a pushing face 328 that is aligned vertically with an inner face of said one of the stoppers 314. The rim 323 of the cover plate 32 can be secured to the annular flange 316 and the lip 317 of the frame of the stake 31 by high frequency welding.

The coupling device includes a first compression spring 35 and a pair of opposite engaging members 33, 34 which are mounted slidably on the cover plate 32 for sliding along the slot 325, and which are engageable with the end wall 43 of the housing 40 for interconnecting the stake 31 and the electrical receptacle 4.

Each engaging member 33 (34) includes a first protrusion 331' (341') that projects from one side of the cover plate 32, and that has an arcuate stem portion 331 (341) projecting from the slot 325 toward the central opening 45, and a hooking end 336 (346) extending laterally from the stem portion 331 (341) and through the central opening 45 into the inner space 44 in the housing 40 for engaging releasably the end wall 43 of the housing 40 at a periphery 46 of the central opening 45. The engaging members 33, 34 are slidable along the slot 325 between a first position, in which the hooking ends 336, 346 of the first protrusions 331', 341' engage the periphery 46 of the central opening 45, and a second position, in which the first protrusions 331', 341' move toward each other from the first position and the hooking ends 336, 346 disengage from the periphery 46 of the central opening 45 for passing through the central opening 45. The first compression spring 35 urges the engaging members 33, 34 to move from the second position to the first position.

Each engaging member 33 (34) further includes a second protrusion 332' (342+) that projects from the other side of the cover plate 32, and that has an anchoring end 332 (342) for retaining the engaging members 33, 34 on the cover plate 32 and for guiding the engaging members 33, 34 to move along the slot 325. The anchoring ends 332, 342 of the second protrusions 332', 342' project into the gap 315, and engage respectively the stoppers 314 when the engaging members 33, 34 are in the first position so that the movement of the engaging members 33, 34 can be limited by the stoppers 314. The anchoring end 332 of the second protrusion 332' of the engaging member 33, which is disposed adjacent to the pushing arm 327 of the cover plate 32, abuts against the pushing face 328 of the pushing arm 327 when the engaging members 33, 34 are in the first position. The periphery 46 of the central opening 45 forms another pushing face 46' (see FIG. 4) which abuts against the stem portion 341 of the first protrusion 341' of the other engaging member 34, which is distal from the pushing arm 327, when the engaging members 33, 34 are in the first position so that the periphery 46 of the central opening 45 can move away and disengage from the hooking end 336 of said engaging member 33 when an external force is applied to the electrical receptacle 4 to move the same and the other engaging member 34 in a direction toward the engaging member 33 which is held against movement by the pushing arm 327.

A pair of opposite hollow studs 335, 345 project respectively from the stem portions 331, 341 of the first protrusions 331', 341' toward each other for receiving two opposite ends 351, 352 of the first compression spring 35.

The hooking end 336 (346) of the first protrusion 331' (341') of each engaging member 33 (34) has a top flat face 338 (348) spaced apart from the periphery 46 of the central opening 45 in the inner space 44 in the housing 40 when the engaging members 33, 34 are in the first position, and a sliding face 336' (346') extending curvedly from the top flat face 338 (348) toward the end wall 43 of the housing 40. The top flat faces 338 (348) of the hooking ends 336, 346 respectively have distal ends that are connected respectively to the sliding faces 336' (346'), and that are spaced apart from each other by a length less than a diameter of the central opening 45 so as to permit the engaging members 33, 34 to move from the first position to the second position when the sliding faces 336' (346') are gradually pushed through the central opening 45.

Figure 5:
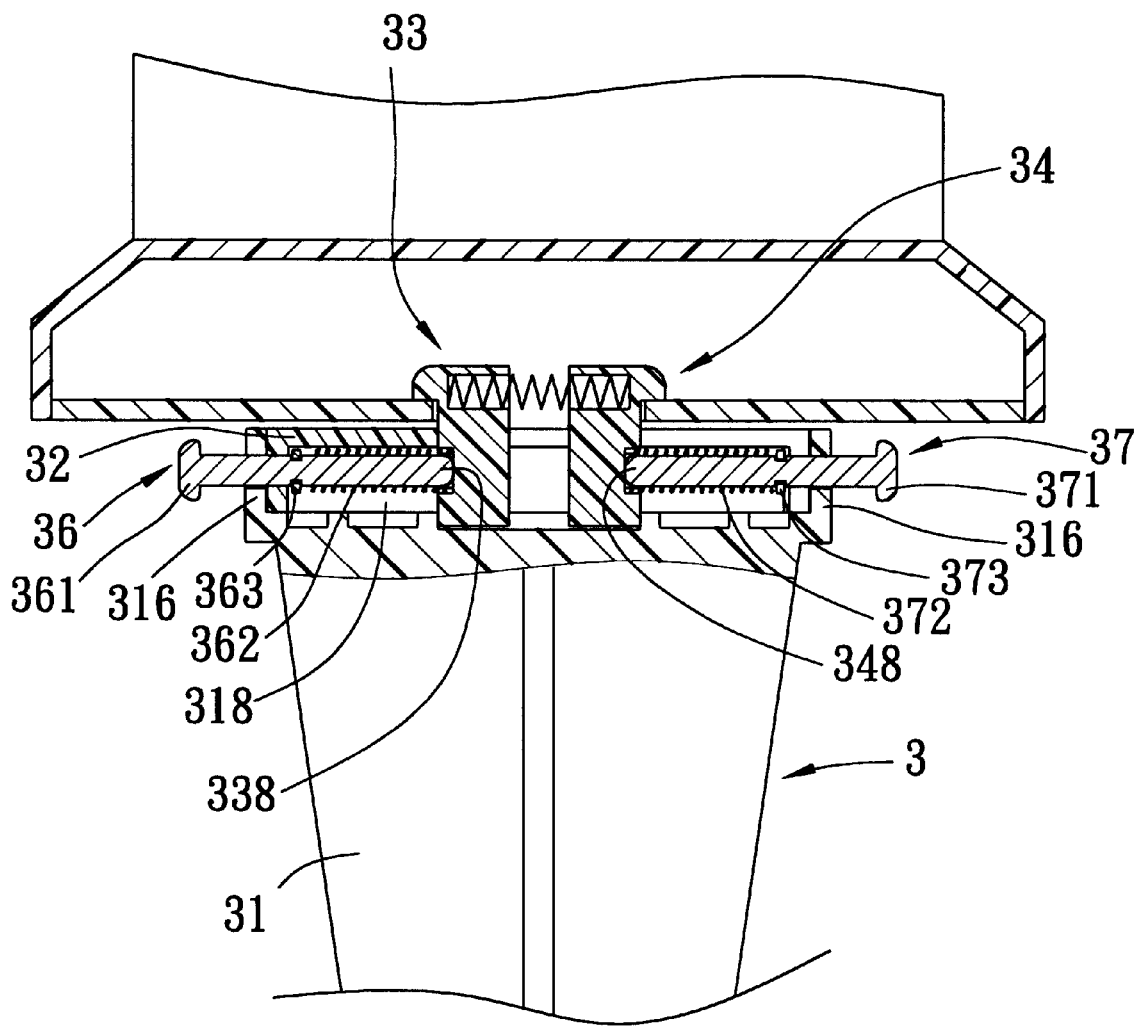
FIG. 5 is a fragmentary cross-sectional side view of a modified embodiment of a stake assembly of this invention with a pair of pushing rods.

Referring now to FIG. 5, in combination with FIGS. 2 to 4, the stake assembly 3 can be modified to further include a pair of opposite pushing rods 36, 37 which respectively have headed ends 361, 371 projecting outwardly and oppositely from the annular flange 316, and pushing ends 338, 348 extending respectively from the headed ends 361, 371 through the annular flange 316 and into the recess 318 to abut respectively against the second protrusions 332', 342' of the engaging members 33, 34 for moving the engaging members 33, 34 from the first position to the second position upon being pushed. A pair of C-shaped retainers 363, 373 are sleeved respectively on the pushing rods 36, 37 within the recess 318 adjacent to the annular flange 316 for retaining the pushing ends 338, 348 of the pushing rods 36, 37 within the recess 318. A pair of second compression springs 362, 372 are sleeved respectively on the pushing rods 36, 37. One of the second compression springs 362, 372 abuts against one of the C-shaped retainers 362, 372 and one of the engaging members 33, 34. The other one of the second compression springs 362, 372 abuts against the other one of the C-shaped retainers 362, 372 and the other one of the engaging members 33, 34 for providing a buffering action and for guiding the movement of the pushing rods 36, 37.

Due to the coupling device, the stake assembly 3 can be mounted on and dismounted from the housing 40 of the electrical receptacle 4 without the need for dismantling the latter. The object of the invention is thus met.

With the invention thus explained, it is apparent that various modifications and variations can be made without departing from the spirit of the present invention. It is therefore intended that the invention be limited only as recited in the appended claims.

I claim:

1. An electrical receptacle assembly, comprising:

an electrical receptacle having a housing wall that is formed with an opening;

a stake having a top end formed with a slot that faces said opening in said housing wall; and a coupling device mounted movably on said top end of said stake for sliding along said slot, said coupling device including a pair of opposite engaging members engageable with said housing wall for interconnecting said stake and said receptacle, said engaging members respectively having first protrusions, each of which has a stem portion projecting from said slot toward said opening and a hooking end extending laterally from said stem portion and through said opening into said receptacle to engage releasably said housing wall at a periphery of said opening, said engaging members being slidable along said slot between a first position, in which said hooking ends of said first protrusions engage said housing wall, and a second position, in which said first protrusions move toward each other from said first position and said hooking ends disengage from said housing wall for passing through said opening, said coupling device further including an urging member that urges said engaging members to move from said second position to said first position.

2. The electrical receptacle assembly of claim 1, wherein said top end of said stake is formed with a frame and a cover plate, said slot being formed in said cover plate, said frame having a top face facing said housing wall and an annular flange projecting from a periphery of said top face to confine a recess, said cover plate being secured to said frame and covering said recess, said first protrusions of said engaging members projecting from one side of said cover plate toward said opening.

3. The electrical receptacle assembly of claim 2, wherein each of said engaging members further has a second protrusion connected to the respective one of said first protrusions and projecting from the other side of said cover plate into said recess, said second protrusion of each of said engaging members having an anchoring end for retaining said engaging member on said cover plate and for guiding said engaging member to move along said slot.

4. The electrical receptacle assembly of claim 3, wherein said frame further has a pair of spaced apart stoppers projecting from said top face toward said cover plate to engage respectively said second protrusions of said engaging members when said engaging members are in said second position so as to limit movement of said engaging members.

5. The electrical receptacle assembly of claim 4, wherein said slot has a closed end aligned with one of said stoppers, said cover plate including a pushing arm projecting from said closed end of said slot toward said one of said stoppers, said pushing arm having a pushing face aligned vertically with an inner face of said one of said stoppers for engaging one of said second protrusions when said engaging members are in said first position.

6. The electrical receptacle assembly of claim 1, wherein said hooking end of each of said first protrusions has a top flat face spaced apart from said housing wall in said receptacle when said engaging members are in said first position, and a sliding face extending curvedly from said top flat face toward said housing wall, said top flat faces respectively having distal ends that are connected respectively to said sliding faces and that are spaced apart from each other by a length less than a diameter of said opening so as to permit said engaging members to move from said first position to said second position when said sliding faces are gradually pushed through said opening.

7. The electrical receptacle assembly of claim 3, wherein said urging member is a compression spring having two opposite ends connected respectively to said stem portions of said first protrusions, said engaging members further including hollow studs projecting respectively from said stem portions and toward each other for receiving said two opposite ends of said compression spring.

8. The electrical receptacle assembly of claim 3, wherein said stake further includes a pair of opposite pushing rods which respectively have headed ends projecting outwardly and oppositely from said annular flange, and pushing ends extending respectively from said headed ends through said annular flange and into said recess to abut respectively against said second protrusions of said engaging members for moving said engaging members from said first position to said second position upon being pushed.

9. The electrical receptacle assembly of claim 8, wherein said stake further includes a pair of C-shaped retainers sleeved respectively on said pushing rods within said recess adjacent to said annular flange for retaining said pushing ends of said pushing rods within said recess, and a pair of compression springs sleeved respectively on said pushing rods, one of said compression springs abutting against one of said C-shaped retainers and one of said engaging members, the other one of said compression springs abutting against the other one of said C-shaped retainers and the other one of said engaging members for providing a buffering action and for guiding the movement of said pushing rods.

10. A stake assembly for an electrical receptacle, comprising:

a stake having a top end formed with a slot; and a coupling device mounted movably on said top end of said stake for sliding along said slot, said coupling device including a pair of opposite engaging members adapted to interconnect said stake and the receptacle, said engaging members respectively having first protrusions, each of which has a stem portion projecting from said slot toward the receptacle, and a hooking end extending laterally from said stem portion and adapted to hook releasably with the receptacle, said engaging members being slidable along said slot between a first position, in which said hooking ends of said first protrusions engage the receptacle, and a second position, in which said first protrusions move toward each other from said first position and said hooking ends disengage from the receptacle, said coupling device further including an urging member that urges said engaging members to move from said second position to said first position.

11. The stake assembly of claim 10, wherein said top end of said stake is formed with a frame and a cover plate, said slot being formed in said cover plate, said frame having a top face and an annular flange projecting from a periphery of said top face to confine a recess, said cover plate being secured to said frame and covering said recess, said first protrusions of said engaging members projecting from one side of said cover plate.

12. The stake assembly of claim 11, wherein each of said engaging members further has a second protrusion connected to the respective one of said first protrusions and projecting from the other side of said cover plate into said recess, said second protrusion of each of said engaging members having an anchoring end for retaining said engaging member on said cover plate and for guiding said engaging member to move along said slot.

13. The stake assembly of claim 12, wherein said frame further has a pair of spaced apart stoppers projecting from said top face toward said cover plate to engage respectively said second protrusions of said engaging members when said engaging members are in said second position so as to limit movement of said engaging members.

14. The stake assembly of claim 12, wherein said stake further includes a pair of opposite pushing rods which respectively have headed ends projecting outwardly and oppositely from said annular flange, and pushing ends extending respectively from said headed ends through said annular flange and into said recess to abut respectively against said second protrusions of said engaging members for moving said engaging members from said first position to said second position upon being pushed.

15. The stake assembly of claim 14, wherein said stake further includes a pair of C-shaped retainers sleeved respectively on said pushing rods within said recess adjacent to said annular flange for retaining said pushing ends of said pushing rods within said recess, and a pair of compression springs sleeved respectively on said pushing rods, one of said compression springs abutting against one of said C-shaped retainers and one of said engaging members, the other one of said compression springs abutting against the other one of said C-shaped retainers and the other one of said engaging members for providing a buffering action and for guiding the movement of said pushing rods.

* * * * *